A. L. PUTNAM.
VEHICLE WHEEL HUB.
APPLICATION FILED SEPT. 7, 1917.
1,295,060. Patented Feb. 18, 1919.
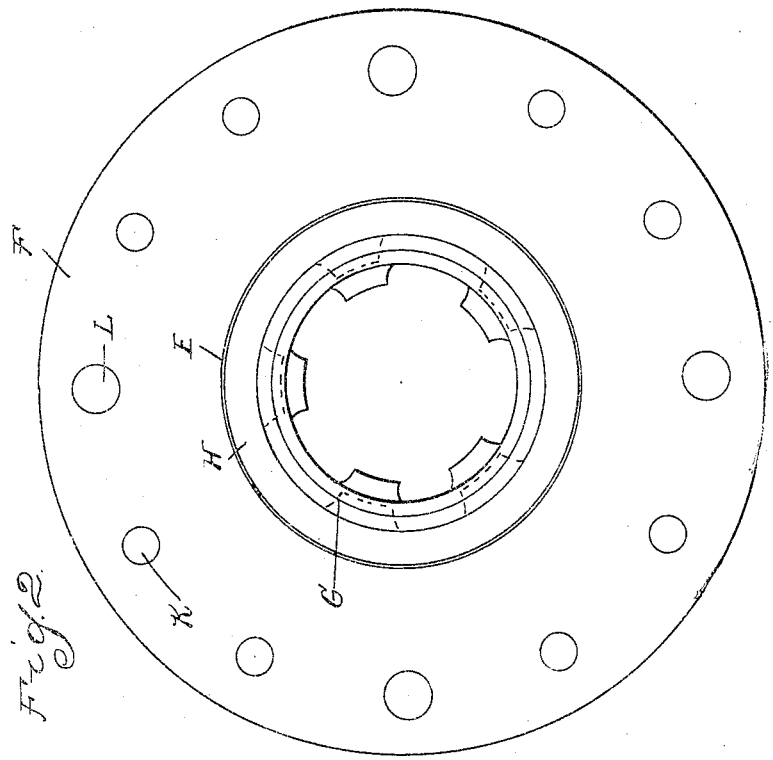
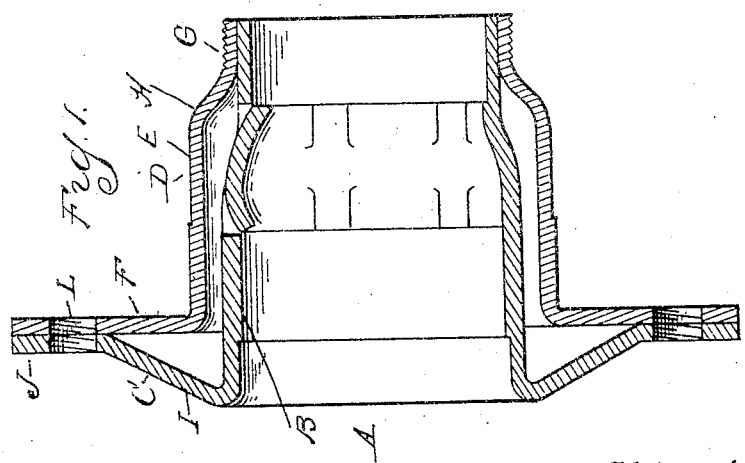
Inventor
Alden L. Putnam
By Whittemore, Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

VEHICLE-WHEEL HUB.

1,295,060.

Specification of Letters Patent.

Patented Feb. 18, 1919.

Application filed September 7, 1917. Serial No. 190,260.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheel Hubs, of which the following is a specification, reference being had therein to the accompanying drawings.

The invention relates to vehicle wheel hubs more particularly designed for use in connection with demountable wheels. In the present state of the art it frequently happens that the hubs for the front and rear wheels of the vehicle differ in diameter. Thus it is usual to have the hubs for the rear wheels of greater diameter than those for the front wheels, but in some instances the reverse is true and the hubs for the front wheels are of greater diameter than those for the rear wheels. Where demountable wheels are used these are attached and detached at the hub, and as the wheel must be interchangeable, front and rear, it is essential that the hubs should be of the same diameter. It is the object of the present invention to overcome this difficulty, which I have accomplished by providing a hub formed with double walls. The outer wall is of a diameter corresponding to the larger of the wheel hubs and the inner wall corresponds to the smaller hub. Thus a demountable wheel of a size to fit the maximum sized hub will also fit the outer wall of my improved hub, while the inner wall thereof is adapted to receive the smaller sized bearings.

In the drawings:

Figure 1 is a longitudinal section through a hub;

Fig. 2 is an end elevation thereof.

A is a hub section preferably formed of pressed sheet-metal and having a cylindrical portion B for receiving the bearings and an outwardly-extending flange portion C for engagement with the demountable wheel. D is a hub section also formed of pressed sheet-metal and having a cylindrical portion E of greater diameter than the portion B and a flange portion F. The outer end of the portion E is contracted in diameter to fit upon the portion B, as indicated at G, and in this portion and the portion E is a tapering portion H. The flange C extends obliquely through the axis of the hub, as indicated at I, and has the portion J parallel to the plane of rotation, which lies adjacent to the flange F. The two sections are secured together in any suitable way, such as by spot-welding the flanges J and F at K. These flanges are also provided with threaded apertures L through which the clamping studs for the demountable wheel pass, these serving as a further coupling means between the two sections.

With the construction as described an exceedingly strong hub is formed, as the outer and inner sections react to mutually strengthen and brace each other. At the same time a bearing is provided for the demountable wheel, and the fact that the hub is hollow diminishes the weight of the structure.

What I claim as my invention is:

1. A wheel-hub, comprising outer and inner sections formed of pressed sheet-metal and having cylindrical portions of different diameters spaced from each other, one of said sections having a portion of a diameter to fit a cylindrical portion of the other section and both sections having flanges which bear against each other.

2. A wheel-hub, comprising outer and inner sections formed of pressed sheet-metal, the outer section having a cylindrical portion of greater diameter than that of the inner section and spaced therefrom, the outer end of said outer section being contracted to fit upon the outer end of the inner section, a flange extending outward from said outer section and a flange on said inner section extending obliquely in cross-section from its point of merger with the cylindrical portion to its point of bearing on the flange of the outer section.

3. A wheel-hub, comprising a pair of pressed sheet-metal sections each having a cylindrical portion and an outwardly-extending flange, the cylindrical portions of said sections being of different diameters and spaced from each other and the flange of one having a portion oblique to the flange of the other to form a brace therefor, and means for securing said sections to each other.

4. A wheel-hub, comprising a pair of sections formed of pressed sheet-metal, the inner section having a cylindrical portion, an outwardly-extending flange oblique in cross-section terminating in a portion parallel to the plane of rotation, the outer section having a cylindrical portion of greater diameter and spaced from said inner section, an outwardly-extending flange lying adjacent and secured to the flange of the inner section, and a contracted end portion for fitting on the cylindrical portion of the inner section, and means for securing said flanges to each other.

5. A wheel hub, comprising outer and inner sections formed of pressed sheet-metal, the outer section having a cylindrical portion of greater diameter than that of the inner section and spaced therefrom, one end of the outer section being contracted to fit upon the corresponding end of the inner section and the other ends of both sections being formed with outwardly projecting flanges, and means for securing said flanges to each other.

In testimony whereof I affix my signature.

ALDEN L. PUTNAM.